(12) United States Patent
Behrens et al.

(10) Patent No.: US 11,873,099 B2
(45) Date of Patent: Jan. 16, 2024

(54) LOAD CARRYING ASSEMBLY

(71) Applicant: AIRBUS HELICOPTERS DEUTSCHLAND GmbH, Donauwörth (DE)

(72) Inventors: Michael Behrens, Harburg (DE); Heiko Brosinger, Ingolstadt (DE)

(73) Assignee: AIRBUS HELICOPTERS DEUTSCHLAND GmbH, Donauwörth (DE)

( * ) Notice: Subject to any disclaimer, the term of this patent is extended or adjusted under 35 U.S.C. 154(b) by 187 days.

(21) Appl. No.: 17/109,519

(22) Filed: Dec. 2, 2020

(65) Prior Publication Data

US 2022/0169386 A1 Jun. 2, 2022

(51) Int. Cl.
*B64D 1/08* (2006.01)
*B64D 1/22* (2006.01)
*B66C 13/06* (2006.01)
*B64C 27/04* (2006.01)

(52) U.S. Cl.
CPC .............. *B64D 1/08* (2013.01); *B64D 1/22* (2013.01); *B66C 13/063* (2013.01); *B64C 27/04* (2013.01)

(58) Field of Classification Search
CPC ............ B64C 27/04; B66C 13/08; B66C 1/10
See application file for complete search history.

(56) References Cited

U.S. PATENT DOCUMENTS

| | | | |
|---|---|---|---|
| 8,226,042 B1 | 7/2012 | Howell et al. | |
| 8,532,846 B2 | 9/2013 | Tollenaere et al. | |
| 8,591,161 B1 * | 11/2013 | Bernhardt | G05D 1/0858 414/137.1 |
| 8,643,850 B1 | 2/2014 | Hartman et al. | |
| 11,339,034 B2 * | 5/2022 | Sikora | B66C 13/085 |
| 2004/0032140 A1 * | 2/2004 | Solstad | B66C 13/08 294/81.4 |
| 2013/0054054 A1 * | 2/2013 | Tollenaere | G05D 1/0858 701/3 |

(Continued)

FOREIGN PATENT DOCUMENTS

| | | |
|---|---|---|
| EP | 3228577 A1 | 10/2017 |
| JP | 2018140860 A | 9/2018 |

(Continued)

OTHER PUBLICATIONS

European Search Report for European Application No. EP 19400019.6, Completed by the European Patent Office, dated Feb. 13, 2020, 7 pages.

(Continued)

*Primary Examiner* — Assres H Woldemaryam
(74) *Attorney, Agent, or Firm* — BROOKS KUSHMAN P.C.

(57) ABSTRACT

A load carrying assembly for carrying a load with a rotary wing aircraft. The load carrying assembly includes a cargo cable and a load engaging system. The cargo cable may have a first end that is attachable to a hoist or a cargo hook arrangement. The load engaging system may include a first attachment that is attached to the second end of the cargo cable, a second attachment that is adapted for receiving a load, a connecting apparatus that connects the first attachment with the second attachment, and at least two first and second thrust producing devices that are attached to the connecting apparatus and produce thrust in a direction that is orthogonal to the cargo cable extension.

20 Claims, 6 Drawing Sheets

(56) References Cited

U.S. PATENT DOCUMENTS

2017/0291707 A1* 10/2017 Veronesi ............... B66C 23/18
2019/0100413 A1    4/2019 Roedts, II et al.
2019/0241267 A1*  8/2019 Sikora .................. B66C 13/063
2020/0140070 A1*  5/2020 George ................. B64C 39/024

FOREIGN PATENT DOCUMENTS

| NO | 20171181 A1   | 1/2019  |
|----|---------------|---------|
| WO | 2007132454 A2 | 11/2007 |
| WO | 2007132454 A3 | 2/2009  |
| WO | 2011012915 A1 | 2/2011  |

OTHER PUBLICATIONS

Siroka, Derek, Carr, Caleb B., and Goodrich, Logan: U.S. Appl. No. 62/627,920, filed Feb. 8, 2018 for Suspended Load Stability System Through Self Powered Automatd Electric Duct Fan Control, 22 pages.

Young, Larry A., Enhanced Rescue Lift Capability, 63rd Annual Forum of the AHS International, Virginia Beach, VA, pp. 22-46, May 1-3, 2007.

McKerrow, Phillip J. and Ratner, D.: The Design of a Tethered Aerial Robot, IEEE International Conference on Robotics and Automation 2007, Rome, Italy, Apr. 10-14, 2007, pp. 355-360, published Apr. 10, 2007.

Notice of Opposition, EP App. No. 19400019.6, Sep. 20, 2022, 38 pages.

Patentee Correspondence in response to the Notice of Opposition, EP App. No. 19400019.6, Jan. 20, 2023, 26 pages.

Letter from Opponent of 01.04.2023, EP App. No. 19400019.6, Apr. 24, 2023, 19 pages.

Summons to Attend Oral Proceedings, EP App. No. 19400019.6, May 25, 2023, 17 pages.

* cited by examiner

LOAD CARRYING ASSEMBLY

BACKGROUND OF THE INVENTION

(1) Field of the Invention

The present embodiments relate to a load carrying assembly and, more particularly, to a load carrying assembly for carrying a load with a rotary wing aircraft.

(2) Description of Related Art

Aircrafts and, more particularly, rotary wing aircrafts such as e.g., helicopters are commonly used to perform aerial transportation and delivery tasks, including passenger transport, disaster relief, or carrying all kind of external loads. By way of example, rotary wing aircrafts are used to transport and deliver loads to mountainous regions in general and, more specifically, to mountainous regions where no roads exist or where roads cannot be used for transportation and delivery, e.g., due to extreme weather conditions in winter and so on.

Furthermore, rotary wing aircrafts are used for transportation and delivery of loads in the construction sector, where the loads may represent any kind of material. Moreover, rotary wing aircrafts can be used in firefighting for transportation of firefighting buckets. In addition, rotary wing aircrafts are also very useful in wood logging for transporting harvested wood. In all of these cases, the rotary wing aircrafts can be required to transport comparatively heavy external loads which can weigh up to several tons.

In order to enable a rotary wing aircraft for transportation of an external load, the rotary wing aircraft can be equipped with a hoist or lift mechanism such as a cargo hook arrangement to which an external load mass rope for connection to the external load can be attached. Thus, a given external load can be suspended from the rotary wing aircraft by means of the external load mass rope, which is particularly useful for bulky loads which do not fit into the cabin of the rotary wing aircraft.

Classically, such a hoist or lift mechanism has a boom that is secured to the fuselage of the aircraft with an external system. The hoist may include a winch mechanism that is fixed to the boom and a rope/cable attached to the winch mechanism so as to be unwound from or wound into the winch mechanism to respectively descend or ascend. Generally, a load carrying harness is secured to the rope/cable. Thus, people and/or objects can be moved by the mechanism while being attached to the load carrying harness.

In many rotary wing aircrafts, the hoist mechanism is located above an access opening provided in the fuselage. This access opening allows people or objects to enter and exit the fuselage. Depending on the requirements of the mission and on the architecture of these rotary wing aircrafts, the opening access may be a side door, a rear door or a movable panel, a floor trap or the like.

In a conventional rescue hoist mechanism, it is quite challenging to control the position of the rescue hoist. Moving the rotary wing aircraft's airframe to control the position of the rescue hoist may be a major obstacle in rescue activities that are often required to be fast and accurate.

For instance, in case of a rescue mission near a steep mountain wall, an operator onboard the aircraft needs to throw a complex rope system to a target position on the mountain wall. There, someone has to catch the rope and pull over the rescue hoist that is attached to the rope. This is especially difficult in windy situations.

Often, lifting a load may cause the load to oscillate or rotate, especially if the load is light, has high drag, and an insufficient sling load length. The rotation or oscillating movement of the load may be transmitted to the aircraft and lead to unstable flight characteristics which must be prevented by all means including countermeasures initiated by the aircraft's pilot or an emergency load drop.

A regular sling load system always operates underneath the aircraft and therefore, in case of a hovering rotary wing aircraft, in its downwash region. This complicates the accurate coupling process of the sling load system with the target and a stable transportation of the load.

Sling load operations often use ropes that are up to 200 m long. Moving cargo attached to these long ropes is very challenging since the load is carried below the aircraft and out of the pilot's sight. Furthermore, flying with a deployed rope without cargo may cause the rope to interfere with and damage a rotor of the rotary wing aircraft, thereby endangering the aircraft and everyone inside.

Document JP 2018/140860 A describes a lifted object attitude stabilizing device. This lifted object attitude stabilizing device has: a body for holding each unit; an upper connection unit that is provided to the body for connection to a rope from above; an attitude detection unit that detects the attitude of a lifted object; an attitude stabilizing mechanism that is provided to the body and stabilizes the attitude of the lifted object on the basis of the detection result of the attitude detection unit; an attitude stabilization control unit that is provided to the body and controls the attitude stabilizing mechanism; and a lower connection unit that is provided to the body so as to connect the rope holding the lifted object.

In particular, the lifted object attitude stabilizing device uses two fans to stabilize the load's vertical axis rotation. The system has a horizontal beam and two electrical fans. The load to be transported is attached to the horizontal beam and its free yaw movement can then be stabilized or actively changed by the fans.

Document U.S. Pat. No. 8,532,846 B2 describes a sling load computer-operated hook assembly for helicopter or unmanned aerial vehicle (UAV). The hook assembly allows automated pick-up and delivery. The computer hook assembly also (1) directs navigation of the aircraft, (2) finds and engages loads for pickup, (3) controls stability of the sling load en route, and (4) releases the load at the delivery point. The self-contained feature allows the hook assembly to be moved from aircraft to aircraft. The hook assembly senses weight, motion and position of the load for stability control. An integral GPS unit is used to direct navigation. These data are transmitted to the aircraft's autopilot and flight director instruments to provide navigation to the designated points and to control load stability en route. Mission data for pick-up and release points can be received remotely from a command and control tactical data net. Alternately, mission data can be locally entered.

In other words, the sling load computer-operated hook assembly determines the position of the hook via cameras, GPS and other location devices, which are installed on the hook to identify the cargo's movement. The sensor data is transmitted via a wireless connection to a computer system that analyses the motion and calculates how the helicopter or UAV has to be maneuvered such that the hook assembly approaches the desired location. However, the hook assembly has no thrust producing devices and has to rely on the movements of the helicopter or UAV.

Document U.S. Pat. No. 8,643,850 B1 describes a method for automatically guiding a lifting device on a lifting apparatus to a lifting point on a load. A beacon that is associated with the lifting point on the load has a plurality of lights arranged in a predetermined pattern. A sensor on the lifting apparatus detects the lights and provides signals to a processor. The processor calculates location of the lifting point, and develops signals that direct the lifting apparatus, or an operator of the lifting apparatus, to engage the lifting point with a lifter on the lifting apparatus. The load may then be lifted and moved.

However, the lifting device has no thrust producing devices and has to rely on the movements of the lifting apparatus to which it is attached, and thereby fails to provide an easy coupling with a load in remote locations.

Document US 2019/0100413 A1 describes a load placement system that precisely places slung loads by allowing a helicopter pilot to essentially reel the load to the ground. The placement system uses lead lines on the slung load that can be connected to the ground by support personnel. A winch system is connected to the lead lines and guides the load to an intended location. The placement system eliminates at least some of the ground personnel previously needed for pulling the load to a target location and orientation. The placement system may eliminate substantially all ground personnel by using unmanned aerial vehicles (UAVs) to automatically connect the lead lines to the ground. The UAVs also may actively control the slung load while in flight to reduce pilot workload and enable higher transport speeds.

In other words, the load placement system uses UAVs at the end of lead lines to enable the drop of a load at a predetermined position, thereby eliminating the need to have ground personnel for receiving the load. The UAVs are able to freely move in all three dimensions. Thus, the load placement system can also control the load during transportation, for example by preventing unwanted rotation.

Document US 2017/0291707 A1 describes systems and methods for operating a hoist and hook assembly. The hoist and hook assembly may determine a position of a target using a position sensor. A hook assembly may be positioned in response to the position of the target as detected by the position sensor. Positioning the hook assembly may include articulating a boom coupled to a hoist, using one or more local thrust sources on the hook assembly, and/or moving an airframe relative to the position of the target.

In particular, three fans that are oriented at a 120° angle to each other move the hook assembly to a desired position in the x-y plane. Compass, position sensor, and communication device may assist in steering the hook assembly.

Document U.S. Pat. No. 8,591,161 B1 describes a maneuvering autonomous rotorcraft cargo attachment system for engaging two mating elements of a coupling mechanism. The maneuvering autonomous rotorcraft cargo attachment system includes a first system on a ship deck to position a first coupling mechanism element in response to positioning commands and a second system attached to a rotorcraft hoist cable to position the second coupling mechanism element in response to positioning commands. A controller calculates and issues the positioning commands to the first and second positioning systems thereby effecting engagement of the two coupling elements.

In particular, two different embodiments of the second system are described. One system has three actuators thrusters with two lateral actuator thrusters and another one in line with a rudder. The other system has four thrusters, two on each side of a box that provide thrust in opposing directions to enable longitudinal, lateral, or rotational movement of the box.

BRIEF SUMMARY OF THE INVENTION

Based on the limitations and drawbacks of the prior art, an objective is to provide a load carrying assembly for carrying a load with a rotary wing aircraft. The load carrying assembly should be able to change its position relative to the load without changing the position of the rotary wing aircraft. The load carrying assembly should also be able to stabilize the load during flight by avoiding rotational movements or oscillating movements of the load. Furthermore, the load carrying assembly should be an active system that can be controlled independently from the rotary wing aircraft.

This objective is solved by an apparatus comprising the features of claim 1. More specifically, a load carrying assembly for carrying a load with a rotary wing aircraft, may comprise a cargo cable and a load engaging system. The cargo cable may comprise a first end that is attachable to at least one of a hoist or a cargo hook arrangement of the rotary wing aircraft, and a second end. The load engaging system may comprise a first attachment that is attached to the second end of the cargo cable, a second attachment that is adapted for receiving a load, a connecting apparatus that connects the first attachment with the second attachment, wherein the connecting apparatus extends between the first and second attachments in a first direction, at least two first thrust producing devices that are attached to the connecting apparatus and produce thrust in a second direction that is orthogonal to the first direction, and at least two second thrust producing devices that are attached to the connecting apparatus and produce thrust in a third direction that is orthogonal to the first and the second directions.

The load carrying apparatus may be a drone-based system which is intended to stabilize and position a load attached to the external rescue hoist or the cargo hook arrangement of a rotary wing aircraft. The load carrying assembly may include a frame and a thrust producing system. An operator may use a remote control to control the thrust producing system, which may push and displace the load relative to the rotary wing aircraft.

The thrust producing system may include multiple fans which enable movement along and rotation around all three axes. If desired, the fans may be electrically driven.

The thrust producing system may be controlled by a flight controller. The flight controller may have several sensors and an onboard computing unit. If desired, flight controller, sensors, and computing unit may be separate entities that are coupled together by a wire or wirelessly.

Illustratively, the load engaging system is equipped with a landing gear. The landing gear may support the frame and avoid damage during the landing process.

The load engaging system is hooked onto a rope, either attached to the cargo hook arrangement or the external hoist. The load carrying assembly may power-up when the rotary wing aircraft is airborne and a load is attached to the load engaging system. The electrical fans may stabilize the load during flight. If desired, the electrical fans may be controlled remotely by the operator. Thus, the operator may remotely maneuver the load engaging system relative to the rotary wing aircraft with or without a load attached to the load engaging system.

In other words, the load engaging system may be remotely controlled and move relative to the rotary wing aircraft to approach a target during a rescue mission or to pick up a cargo in an area in which moving the rotary wing aircraft may be dangerous.

Furthermore, the ability to perform pick-up and drop-off operations more precisely may eliminate the need for ground personnel. Moreover, the pilots' workload is reduced due to the possibility of keeping the rotary wing aircraft steadily hovering while the more precise position adjustment is done by the load engaging system.

Reducing the pilots' workload could be especially crucial in mountain rescue missions close to a cliff, where the rotary wing aircraft needs to maintain a safe distance from the cliff, or in offshore wind farm access, where the rotary wing aircraft cannot come too close to the blades of the wind mills, nor can the cargo cable of the load carrying assembly be allowed to swing close to the blades of the wind mills.

A load engaging system that is movable relative to the rotary wing aircraft also allows escaping the downwash region of the rotary wing aircraft, thereby bringing the operation of the load engaging system to a safer area on the side of the rotary wing aircraft where the load is not affected directly by the strong masses of air produced by the rotors. Moreover, escaping the downwash region provides an increased clearance during the mission by reducing the amount of dirt or small particles that are stirred up by the strong masses of air from the rotors.

Placing a camera on the front of the load engaging system may increase the overall safety of a load pick-up or drop-off operation. For example, a camera may provide more control by informing the pilots about their surroundings, thereby increasing the chances of success at the first attempt of the load pick-up or drop-off operation. As a consequence, the duration of the load pick-op or drop-off operation may be reduced, which reduces the time during which the rotary wing aircraft has to stay in a dangerous zone.

A camera on the load engaging system may also eliminate the need for modifications to the rotary wing aircraft that are sometimes required for performing rescue missions. Examples include the adaptation of the windows (e.g., bubble windows, etc.) for a better visibility of the targeted load by the pilots.

Moreover, for aerial filming, camera equipment may be installed on the load engaging system, which may provide more degrees of freedom compared to a conventional camera attachment solution and result in a shadow free solution for better quality pictures.

During flight, the load engaging system may prevent that the cargo cable comes in contact with a rotor of the rotary wing aircraft by steering the load engaging system, and thereby the cargo cable, away from the rotor. As a result, the rotary wing aircraft may move faster and safer, even with the cargo cable extended.

Illustratively, the load carrying assembly may be installed in any rotary wing aircraft and does not require any changes or new certifications of the aircraft.

The load engaging system can control the end of the cargo cable along every axis, with the exception of the height. The height may be controlled by the rotary wing aircraft's altitude or the cargo cable extension (e.g., using a winch).

Thus, the load engaging system may travel in one direction of a plane (e.g., in longitudinal direction of the aircraft or along an x-axis) using the thrust of the main fans, or in the other direction of the plane (e.g., in lateral direction of the aircraft or along a y-axis) using the thrust of any one of the side fans.

The main fans also allow the load engaging system to pivot in the plane (e.g., in the x-y-plane), which is sometimes also referred to as yaw rotation, by driving the main fans at different speeds. Thus, the load engaging system may first pivot around the vertical axis and then move in the other direction of the plane (e.g., in lateral direction of the aircraft or along a y-axis) using the thrust of the main fans.

In other words, the load engaging system can be placed in any point of a reversed cone below the rotary wing aircraft, whereby the height of the cone and the radius of the cone's base is defined by the length of the cargo cable extension.

Besides the yaw rotation, the load engaging system may use the main fans and the side fans to provide rotation around the one direction of the plane (e.g., rotation around the x-axis), which is sometimes also referred to as roll rotation and provide rotation around the other direction of the plane (e.g., rotation around the y-axis), which is sometimes also referred to as pitch rotation.

In other words, the load engaging system may stabilize a load during flight by controlling movement in the x-y plane and by controlling yaw, roll, and pitch rotation.

According to some embodiments, the cargo cable is provided to move the load engaging system in the first direction.

According to some embodiments, the at least two first thrust producing devices are adapted to move the load engaging system in the second direction and to enable rotational movement around an axis defined by the first direction.

According to some embodiments, the at least two second thrust producing devices are adapted to move the load engaging system in the third direction.

According to some embodiments, the at least two first thrust producing devices comprise rotating blades.

According to some embodiments, the at least two second thrust producing devices comprise rotating blades.

According to some embodiments, the connecting apparatus comprises a beam that connects the first attachment with the second attachment, wherein the beam is adapted to transfer the weight of the load from the second attachment to the first attachment and wherein the beam defines the first direction. The connecting apparatus further comprises a box that is attached to the beam.

According to some embodiments, the at least two first thrust producing devices are attached to the connecting apparatus in the third direction on opposite sides of the box, and wherein the at least two second thrust producing devices are attached to the connecting apparatus on the same side of the box at which the second attachment is arranged.

According to some embodiments, the first attachment further comprises a swivel that is provided to enable rotational movement of the box around the axis defined by the first direction relative to the cargo cable.

According to some embodiments, the load carrying assembly further comprises a plurality of sensors that is attached to the connecting apparatus and generates sensor data about the status of the load engaging system, wherein the sensor data is associated with at least one of a motion variation of the load engaging system, a rotation around the axis defined by the first direction, a rotation around a first additional axis defined by the second direction, or a rotation around a second additional axis defined by the third direction.

According to some embodiments, the plurality of sensors further comprises a camera that is attached to the connecting apparatus and generates sensor data in form of a video feed.

According to some embodiments, the load carrying assembly further comprises a communication device that is attached to the connecting apparatus, coupled to at least some of the plurality of sensors, and adapted to send at least a portion of the sensor data from the at least some of the plurality of sensors to an operator and to receive command signals from the operator.

According to some embodiments, the load carrying assembly further comprises a controller that is attached to the connecting apparatus and controls the at least two first and second thrust producing devices based at least on some of the sensor data or the command signals from the operator.

According to some embodiments, the load carrying assembly further comprises at least one of a battery that is attached to the connecting apparatus or a power harness that is coupled to the cargo cable, wherein the at least one of a battery or a power harness supplies electricity to the at least two first thrust producing devices.

Furthermore, a method for operating a load carrying assembly described above comprises the operations of using a plurality of sensors to generate sensor data about the status of a load engaging system that is attached via a cargo cable and at least one of a hoist or a cargo hook arrangement to the rotary wing aircraft, wherein the sensor data is associated with at least one of a motion variation of the load engaging system, a rotation around a first axis defined by a first direction, a rotation around a second axis defined by a second direction, or a rotation around a third axis defined by a third direction, wherein the first, second, and third directions are orthogonal to each other; with a communication device, receiving command signals from an operator; and using a controller to control at least some of at least two first and second thrust producing devices based at least on some of the sensor data or the command signals from the operator.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1A:
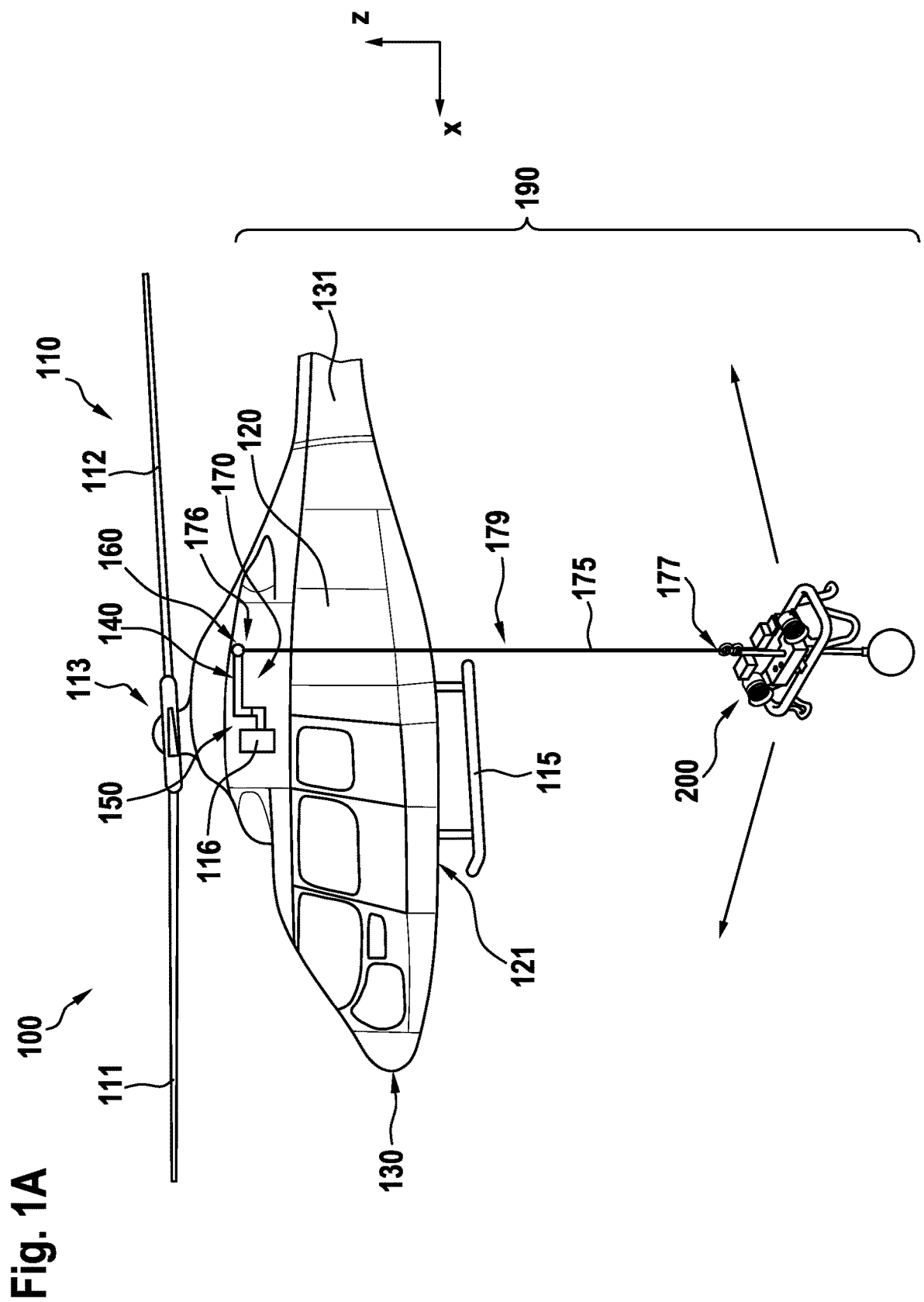
FIG. 1A is a diagram of an illustrative rotary wing aircraft with a load carrying assembly that is attached to a hoist mechanism located above an access opening in the fuselage in accordance with some embodiments.

Exemplary embodiments may be included in any rotary wing aircraft that is adapted for vertical take-off and landing.

FIG. 1 shows an example of a rotary wing aircraft 100. The rotary wing aircraft may be a multicopter, a drone, or any other rotorcraft such as tiltable-wing, fixed-wing, or wingless aircraft. Aircraft 100 is exemplarily illustrated as a helicopter. Thus, for purposes of simplicity and clarity, aircraft 100 is hereinafter referred to as "helicopter" 100.

Helicopter 100 is exemplarily embodied with fuselage 120 and at least one multi-blade main rotor 110 for providing lift and forward or backward thrust during operation.

At least one multi-blade main rotor 110 illustratively comprises a plurality of rotor blades 111, 112. Rotor blades 111, 112 are mounted at an associated rotor head 113 to a rotor shaft, which rotates in operation of helicopter 100 around the rotor shaft.

Fuselage 120 comprises fuselage underside 121 that is illustratively connected to landing gear 115. Landing gear 115 is exemplarily embodied as a skid-type landing gear.

Fuselage 120 may define nose region 130 that is arranged in front of fuselage 120. Fuselage 120 also defines tail boom 131, which is cut away and not shown in greater detail, for simplicity and clarity of the drawings.

If desired, helicopter 100 may provide equipment 160 such as an external load device (e.g., a hoist 170) that is secured to fuselage 120 with component 140 that is attached to motor 116 via power transmission system 150. Motor 116 may illustratively be arranged under rotor head 113 and provide a rotational movement to power transmission system 150.

Power transmission system 150 may transform the rotational movement of motor 116 into a circular movement of component 140. An outward circular movement of component 140 (i.e., a circular movement of component 140 that moves equipment 160 away from helicopter 100) may deploy equipment 160, whereas an inward circular movement of component 140 (i.e., a circular movement of component 140 that moves equipment 160 closer to helicopter 100) may retrieve equipment 160.

Helicopter 100 may include a load carrying assembly 190 for carrying a load. The load carrying assembly 190 may include cargo cable 175 and load engaging system 200. Illustratively, cargo cable 175 may have a first end 176 that is attachable to hoist 170 and a second end 177 that is attached to an attachment of the load engaging system 200. If desired, hoist 170 may deploy and retrieve cargo cable 175, thereby determining the deployed length of cargo cable 175 (i.e., the extension of cargo cable 175 from helicopter 100 in z-direction). In other words, cargo cable 175 is provided to move the load engaging system in the z-direction.

Load engaging system 200 may include at least two thrust producing devices that produce thrust in at least one direction that is vertical to the z-direction, thereby moving load engaging system 200 along a spherical surface that is defined by the length of the deployed cargo cable 175.

The at least two thrust producing devices may be powered electrically, if desired. By way of example, a power harness 179 may be coupled to cargo cable 175 and supply electricity to the at least two thrust producing devices.

Figure 3A:
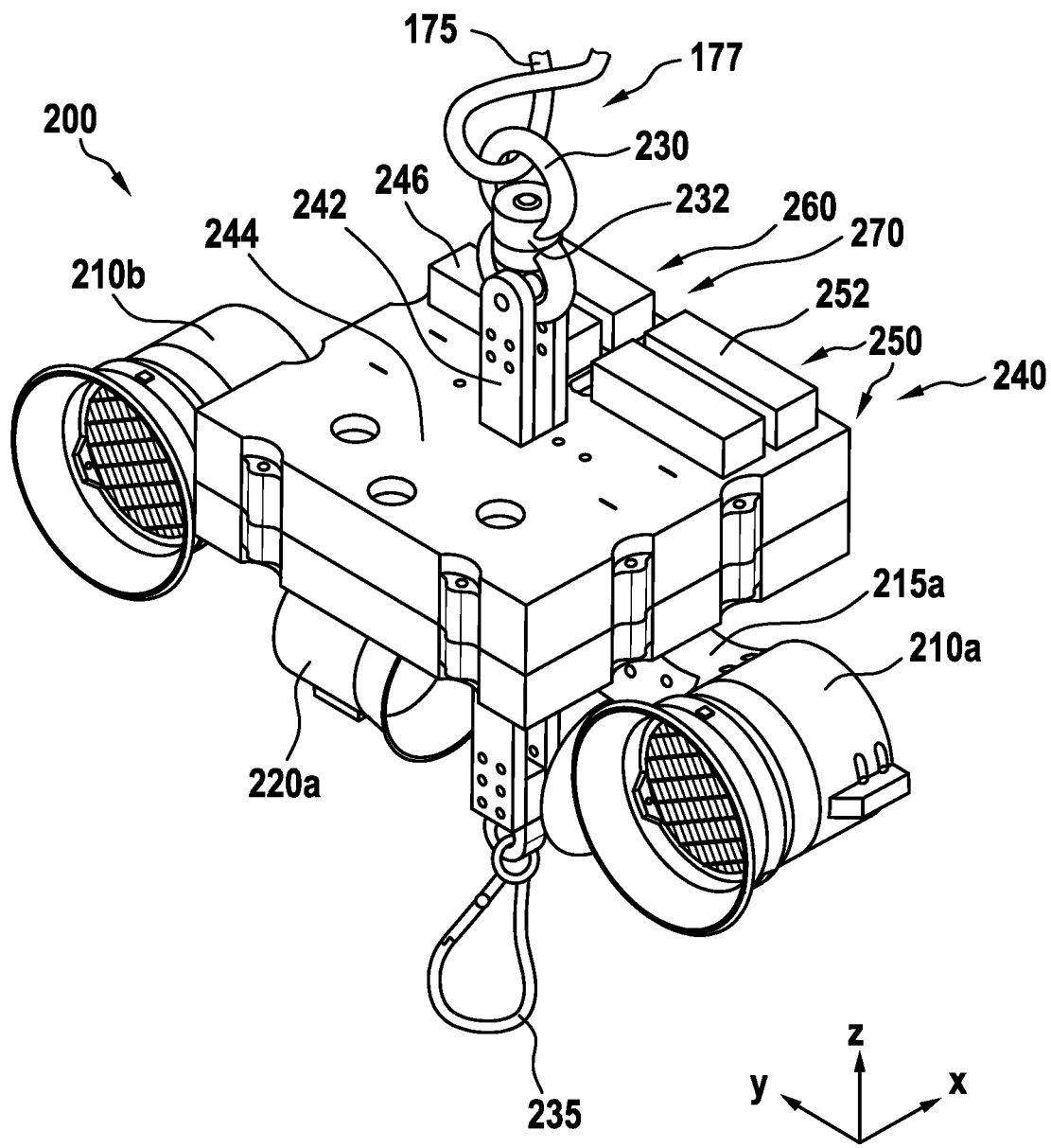
FIG. 3A is a diagram of an illustrative load engaging system in accordance with some embodiments.
Figure 3B:
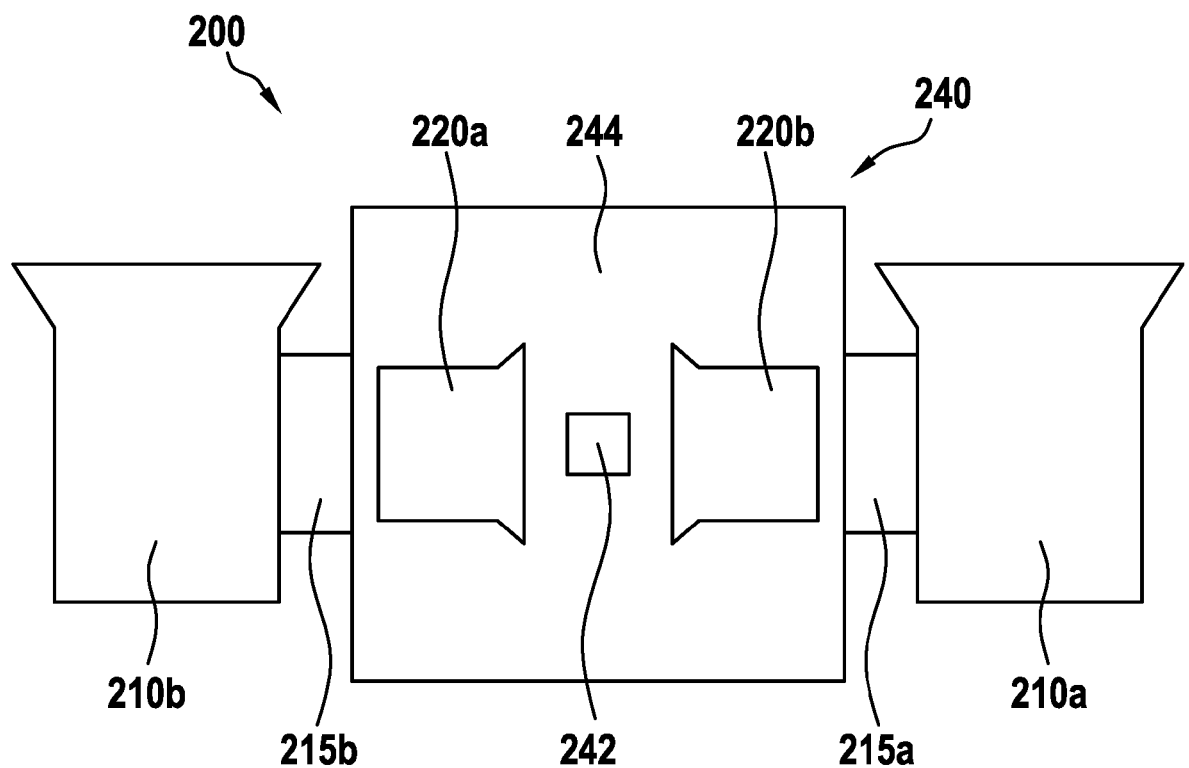
FIG. 3B is a diagram of the illustrative load engaging system of FIG. 3A seen from below in accordance with some embodiments.

Illustratively, load engaging system 200 of FIGS. 3A and 3B may implement the load engaging system 200 of FIG. 1A that is attached to second end 177 of cargo cable 175.

Figure 1B:
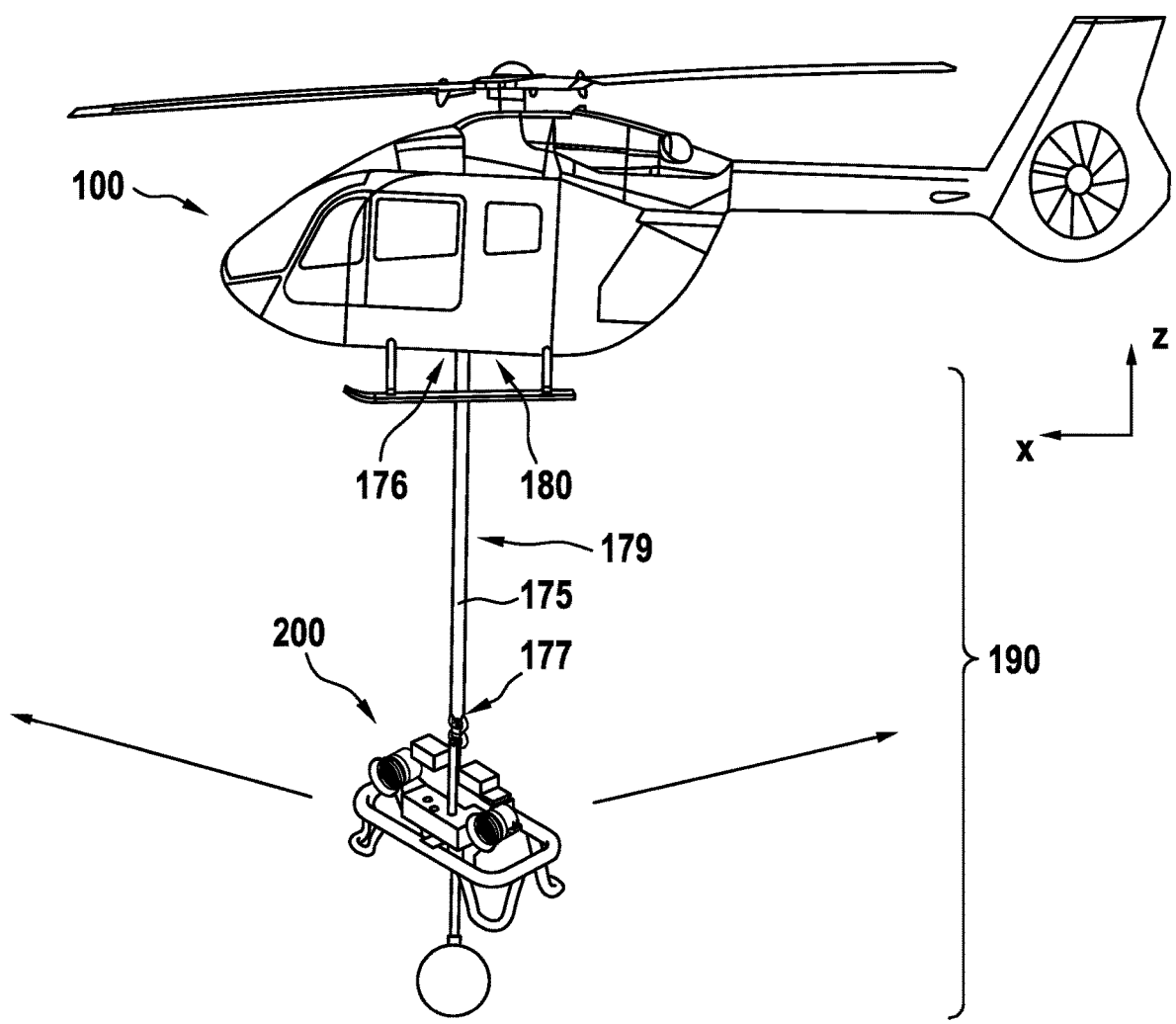
FIG. 1B is a diagram of an illustrative rotary wing aircraft with a load carrying assembly that is attached to a cargo hook arrangement located at the underside of the fuselage in accordance with some embodiments.

FIG. 1B is a diagram of an illustrative rotary wing aircraft 100 with a load carrying assembly 190 that is attached to a cargo hook arrangement 180 located at the fuselage underside 121. Illustratively, cargo hook arrangement 180 may be removably installed in the subfloor region of rotary wing aircraft 100 between a floor structure and a bottom shell.

By way of example, cargo hook arrangement 180 is mounted between two longerons, and longerons are connected to floor structure and bottom shell. If desired, cargo hook arrangement 180 may be mounted between two transversal frame components instead.

A first end 176 of cargo cable 175 may be attachable to the cargo hook arrangement 180. For example, cargo hook arrangement 180 may include a winch and the first end 176 of cargo cable 175 may be attachable to the winch. When the first end of 176 of cargo cable 175 is attached to the winch, the winch may deploy cargo cable 175, thereby determining the length of deployed cargo cable 175 (i.e., the maximal extension of cargo cable 175 from helicopter 100 in z-direction).

A second end 177 of cargo cable 175 may be attached to an attachment of load engaging system 200. Illustratively, load engaging system 200 of FIGS. 3A and 3B may implement the load engaging system 200 of FIG. 1B that is attached to second end 177 of cargo cable 175.

By way of example, load engaging system 200 may include at least two first thrust producing devices that produce thrust in x-direction that is orthogonal to the z-direction. If desired, load engaging system 200 may include at least two second thrust producing units that produce thrust in y-direction that is orthogonal to the x- and z-direction.

In other words, the at least two first and second thrust producing devices may move load engaging system 200 along a spherical surface that is defined by the length of the deployed cargo cable 175 and the position from which the cargo cable 175 is deployed. The position of load engaging system 200 on the spherical surface may be defined by the length of the deployed cargo cable 175 and two angles (e.g., a first angle between cargo cable 175 and z-axis and a second angle between cargo cable 175 and x-axis).

Figure 2A:
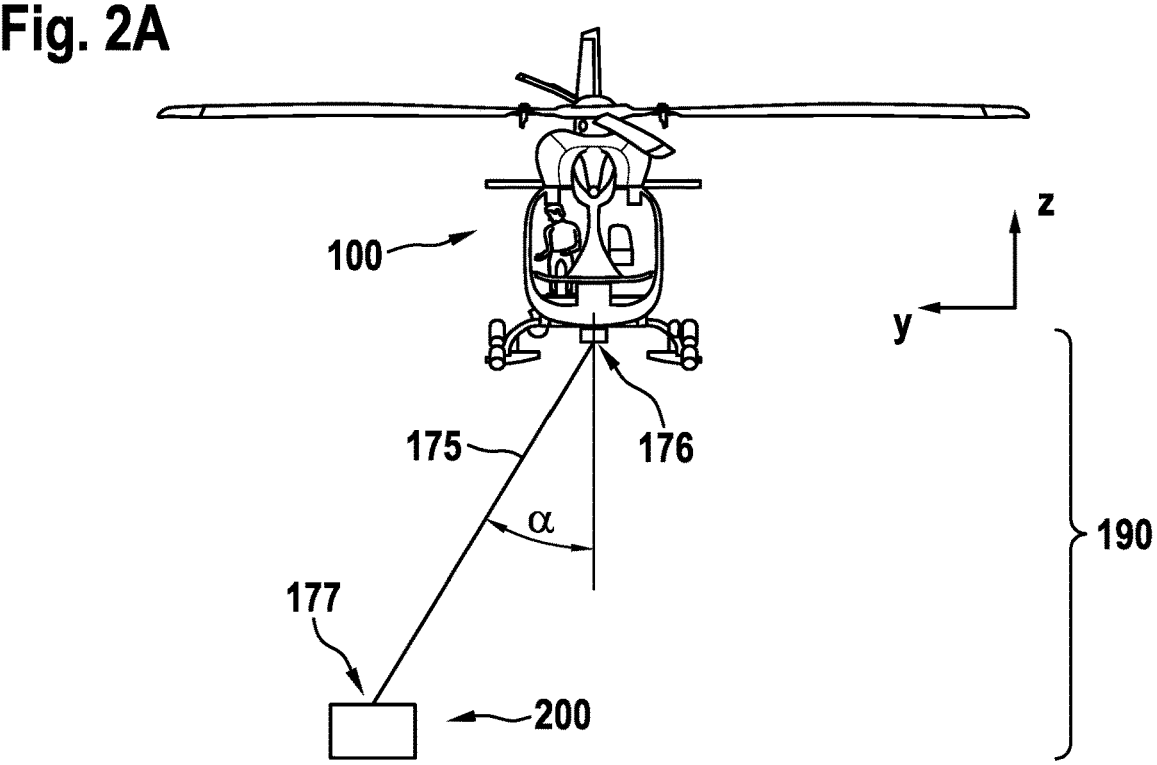
FIG. 2A is a diagram of an illustrative rotary wing aircraft with a load engaging assembly that is positioned at an angle from a vertical axis of the rotary wing aircraft in accordance with some embodiments.
Figure 2B:
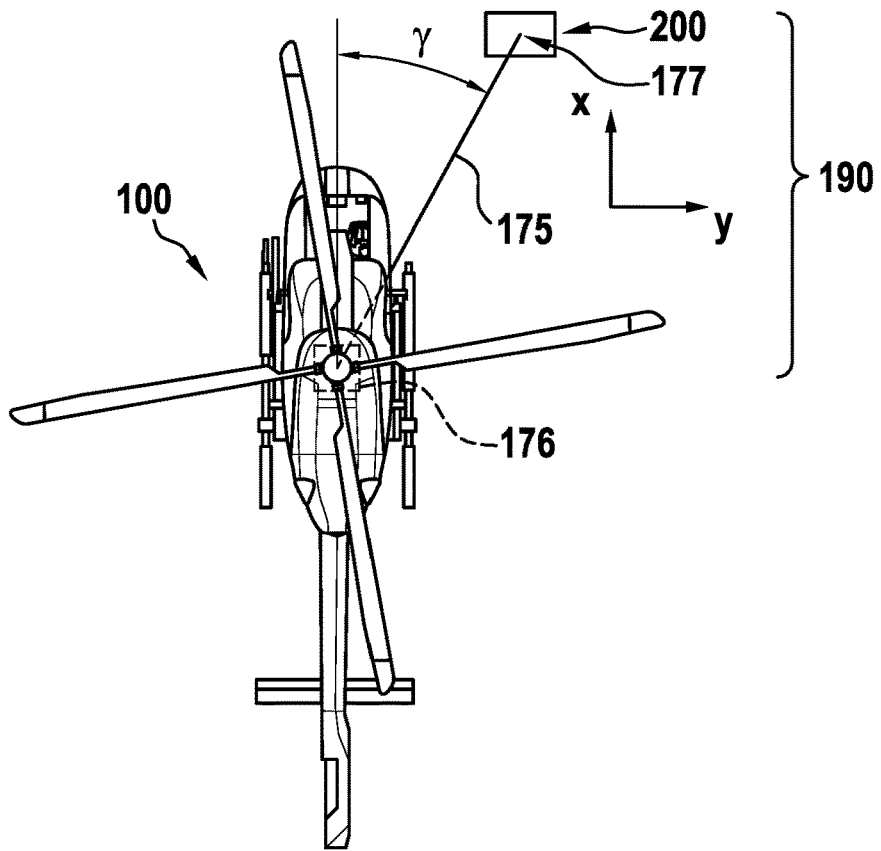
FIG. 2B is a diagram of an illustrative rotary wing aircraft with a load engaging assembly that is positioned at an angle from a longitudinal axis of the rotary wing aircraft in accordance with some embodiments.

FIG. 2A shows illustratively the first angle between cargo cable 175 and z-axis as angle α. FIG. 2B shows illustratively the second angle between cargo cable 175 and x-axis as angle γ. Alternatively, the second angle may be shown as an angle β between cargo cable 175 and y-axis. The angle β between cargo cable 175 and y-axis may also be computed as 13=90°−γ.

FIGS. 2A and 2B illustratively show cargo cable 175 attached to a cargo hook arrangement such as cargo hook arrangement 180 of FIG. 1A. Thus, the position from which the cargo cable 175 is deployed is below helicopter 100. However, cargo cable 175 may be attached to a hoist such as hoist 170 of FIG. 2A, if desired. Attaching cargo cable 175 to a hoist changes the position from which the cargo cable 175 is deployed.

FIGS. 3A and 3*b* are diagrams of an illustrative load engaging system 200. Load engaging system 200 may include attachment 230 that is attached to the second end 177 of cargo cable 175. If desired, load engaging system 200 may include attachment 235 that is adapted for receiving a load.

Attachment 230 may be embodied by an eye, a hook, a snap hook, a spring safety hook, a swivel hook, a ring, or any other attachment that may be attached to the second end 177 of cargo cable 175. Attachment 235 may each be embodied by an eye, a hook, a snap hook, a spring safety hook, a swivel hook, a ring, or any other attachment that may be adapted for receiving a load.

Illustratively, load engaging system 200 may include a connecting apparatus 240 that connects attachment 230 with attachment 235. Connecting apparatus 240 may extend between attachments 230, 235 in z-direction.

As shown, connecting apparatus 240 may include a beam 242 that connects attachment 230 with attachment 235. The beam 242 may be adapted to transfer the weight of the load from attachment 235 to attachment 230. Beam 242 may define the z-direction.

If desired, connecting apparatus 240 may include a box 244. Illustratively, the box may be attached to beam 242. By way of example, swivel 232 may be provided between attachment 230 and beam 242. Swivel 232 may enable rotational movement of box 244 around the axis defined by the z-direction of FIGS. 1A to 2A relative to cargo cable 175.

A plurality of sensors 250 may be attached to connecting apparatus 240. Sensors 250 may generate sensor data about the status of load engaging system 200. For example, sensors 250 may generate sensor data that includes at least one of a motion variation of the load engaging system 200 (e.g., in x-, y-, or z-direction of FIGS. 1A to 2B), a rotation around an axis defined by a first direction (e.g., z-direction of FIGS. 1A to 2A), a rotation around another axis defined by a second direction (e.g., x-direction of FIG. 1A, 1B, or 2B), or a rotation around yet another axis defined by a third direction (e.g., y-direction of FIG. 2A or 2B).

As an example, the plurality of sensors 250 may include a camera 252 that is attached to connecting apparatus 240 and generates sensor data in form of a video feed. If desired, additional cameras may be attached to connecting apparatus 240 and provide a video feed of different directions.

The video feed of camera 252 may be transmitted to virtual reality (VR) glasses that an operator who controls the load engaging system 200 may wear.

If desired, the plurality of sensors 250 may include a GPS device, one or more gyro sensors (e.g., a gyro sensor for each one of x-, y-, and z-axis), one or more velocity sensors, etc.

Illustratively, a communication device 260 may be attached to connecting apparatus 240. Communication device 260 may be coupled to at least some of the plurality of sensors 250. Communication device 260 may be adapted to send at least a portion of the sensor data from the at least some of the sensors 250 to an operator. Communication device 260 may be adapted to receive command signals from the operator.

If desired, communication device 260 may communicate with a controller 270 that is attached to connecting apparatus 240. As an example, communication device 260 may receive instructions from the operator and communicate the instructions to controller 270. As another example, communication device 260 may send at least a portion of the sensor data, which may be the same or a different portion of the sensor data that the communication device 260 sends to the operator, to controller 270.

Communication device 260 may include a wireless communication module such as a radio frequency (RF) module, an infrared communication module, an ultrasonic communication module, or any other wireless communication module that enables communication between load engaging system 200, the operator, and controller 270.

Communication device 260 may include a wired communication module such as a fiber-optic cable, a coaxial cable, an ethernet cable, or any other wired communication cable and respective receive and transmit modules for communication over fiber-optic cable, coaxial cable, ethernet cable, or any other wired communication cable.

By way of example, any one of battery 248, sensors 250, communication device 260, and/or controller 270 may be placed on the outside or on the inside of box 244. The connections between battery 248, sensors 250, communication device 260, and/or controller 270 may be placed inside box 244 for ensuring a safe flight.

Illustratively, at least two first thrust producing devices 210a, 210b may be attached to connecting apparatus 240. The at least two first thrust producing devices 210a, 210b may produce thrust in x-direction that is orthogonal to z-direction.

The at least two first thrust producing devices 210a, 210b may be attached to connecting apparatus 240 in y-direction on opposite sides of box 244 (e.g., using attachments 215a, 215b shown in FIG. 3B).

Thus, the at least two first thrust producing devices 210a, 210b are adapted to move load engaging system 200 in x-direction (e.g., by operating the at least two first thrust producing devices 210a, 210b at the same speed) and to enable rotational movement around the z-axis (e.g., by operating the at least two first thrust producing devices 210a, 210b at different speeds).

Illustratively, at least two second thrust producing devices 220a, 220b may be attached to connecting apparatus 240 and are shown in FIG. 3B. The at least two second thrust producing devices 220a, 220b may produce thrust in y-direction that is orthogonal to x-direction and y-direction.

The at least two second thrust producing devices 220a, 220b may be attached to connecting apparatus 240 on the same side of box 244 at which attachment 235 is arranged. In other words, the at least two second thrust producing devices 220a, 220b may be attached below the box. If desired, the at least two second thrust producing devices 220a, 220b may be attached to connecting apparatus 240 on the same side of box 244 at which attachment 230 is arranged (i.e., above box 244).

The at least two second thrust producing devices 220a, 220b may be arranged facing each other. If desired, the at least two second thrust producing devices 220a, 220b may be arranged turned away from each other.

Thus, the at least two second thrust producing devices 220a, 220b may be adapted to move load engaging system 200 in y-direction. As shown in FIG. 3B, thrust producing device 220a may be powered and thrust producing device 220b may be turned off to move load engaging system 200 in positive y-direction. Similarly, thrust producing device 220a may be turned off and thrust producing device 220b may be powered to move load engaging system 200 in negative y-direction.

The at least two first thrust producing devices 210a, 210b and/or the at least two second thrust producing devices 220a, 220b may include rotating blades. The rotating blades may provide thrust. The at least first and second thrust producing devices 210a, 210b, 220a, 220b may be identical. If desired, the at least first thrust producing devices 210a, 210b may be different than the at least two second thrust producing devices 220a, 220b.

The at least two first and second thrust producing devices 210a, 210b, 220a, 220b may be any type of thrust producing device such as a fan, a propeller, a rotor, a jet fan, or any other type of thrust producing device. The at least two first and second thrust producing devices 210a, 210b, 220a, 220b may enclose the rotating apparatus (e.g., the rotating blades) within a protective grid to avoid that any part of the load (e.g., a loose rope or a loose tissue) may damage the respective thrust producing device during pick-up, drop-off, and transportation of the load.

The thrust produced by each one of the at least two first and second thrust producing devices 210a, 210b, 220a, 220b may be controllable individually.

If desired, controller 270 that is attached to the connecting apparatus 240 may control the at least two first and second thrust producing devices 210a, 210b, 220a, 220b based at least on some of the sensor data and the command signals from the operator. In particular, controller 270 may control the rotational speed of each one of the at least two first and second thrust producing devices 210a, 210b, 220a, 220b individually.

Thus, controller 270 may stabilize the flight behavior of load engaging system 200 by correcting and compensating any involuntary movements of load engaging system 200.

The at least two first and second thrust producing devices 210a, 210b, 220a, 220b may be electrically powered, if desired.

The load carrying assembly 190 may include a battery 246 that is attached to the connecting apparatus 240. For example, battery 246 may be located inside box 244. Battery 246 may supply electricity to the at least two first and/or second thrust producing devices 210a, 210b, 220a, 220b. If desired, battery 246 may provide electricity to the plurality of sensors 250, communication device 260, and/or controller 270.

Figure 4:
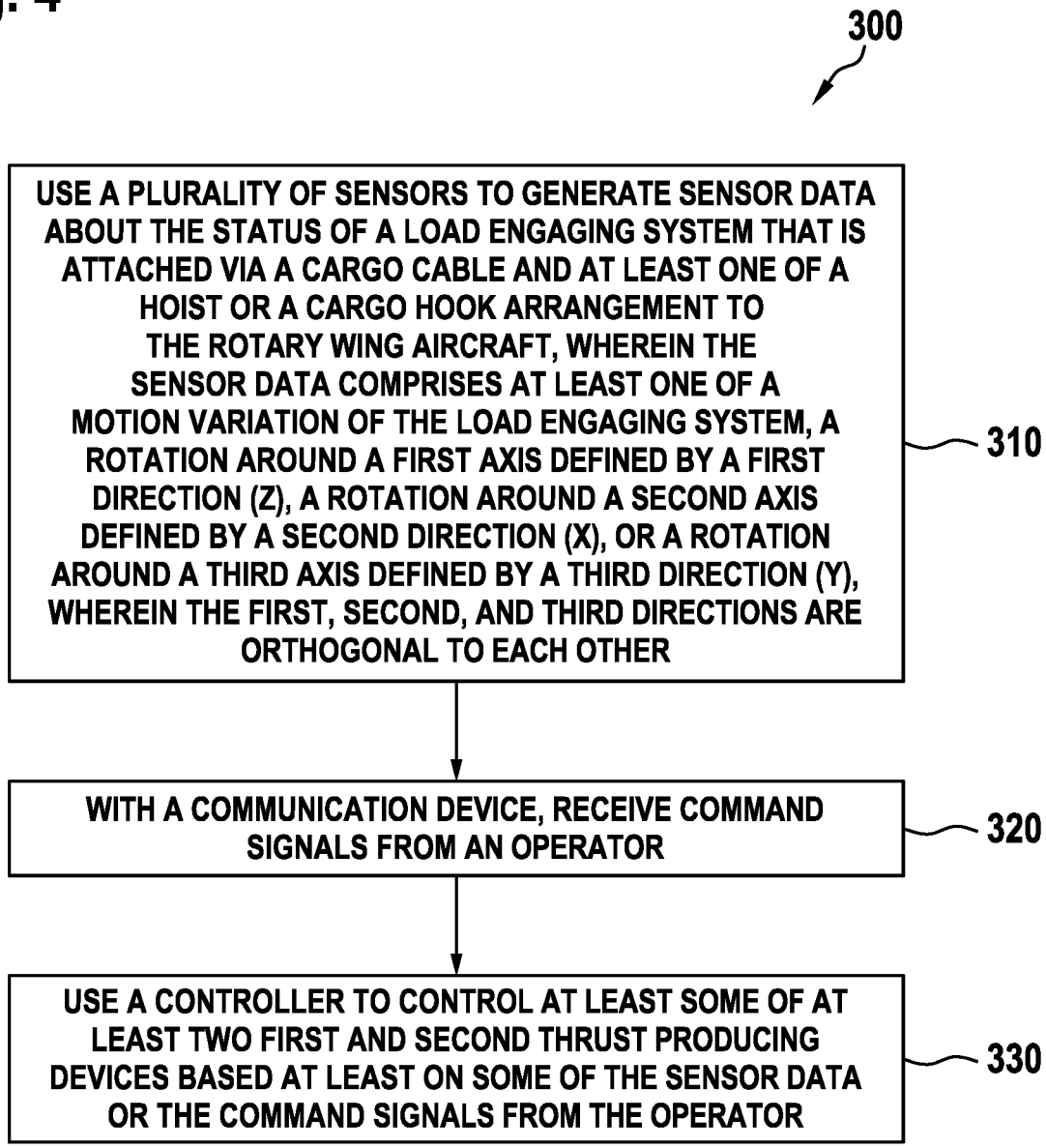
FIG. 4 is a flowchart showing illustrative operations for operating a load carrying assembly in accordance with some embodiments.

FIG. 4 is a flowchart 300 showing illustrative operations for operating a load carrying assembly for carrying a load with a rotary wing aircraft.

During operation 310, the load carrying assembly may use a plurality of sensors to generate sensor data about the status of a load engaging system that is attached via a cargo cable and at least one of a hoist or a cargo hook arrangement to the rotary wing aircraft, wherein the sensor data comprises at least one of a motion variation of the load engaging system, a rotation around a first axis defined by a first direction (z), a rotation around a second axis defined by a second direction (x), or a rotation around a third axis defined by a third direction (y), wherein the first, second, and third directions are orthogonal to each other.

For example, load carrying assembly 190 of FIGS. 1A to 2B may use sensors 250 of FIG. 3A that are attached to connecting apparatus 240 of load engaging system 200 to generate sensor data about the status of load engaging system 200. Load engaging system 200 may be attached via cargo cable 175 and at least one of a hoist 170 or a cargo hook arrangement 180 to the rotary wing aircraft. The sensor data about the status of load engaging system 200 may include at least one of a motion variation of load engaging system 200, a rotation around z-axis, a rotation around x-axis, or a rotation around y-axis, whereby x-axis, y-axis, and z-axis form a cartesian coordinate system.

During operation 320, the load carrying assembly may, with a communication device, receive command signals from an operator.

For example, load carrying assembly 190 of FIGS. 1A to 2B may use communication device 260 of FIG. 3A that is attached to connecting apparatus 240 of load engaging system 200 to receive command signals from an operator.

During operation 330, the load carrying assembly may use a controller to control at least some of at least two first and second thrust producing devices based at least on some of the sensor data or the command signals from the operator.

For example, load carrying assembly 190 of FIGS. 1A to 2B may use controller 270 of FIG. 3A to control at least some thrust producing devices 210a, 210b, 220a, 220b based at least on some of the sensor data or the command signals from the operator.

It should be noted that the above-described embodiments are merely described for illustration purposes, but not in order to restrict the present invention thereto. Instead, multiple modifications and variations of the presented embodiments are possible and should, therefore, also be considered as being part of the invention.

For example, load engaging system 200 of FIGS. 3A and 3B is shown with two thrust producing devices 210a, 210b that are attached on both sides of box 244. However, thrust producing devices 210a, 210b of FIGS. 3A and 3B may be attached differently. For example, thrust producing devices 210a, 210b may be attached on top or below 244.

As another example, box 244 of load engaging system 200 of FIG. 3A is shown as having the shape of a cuboid. However, box 244 may have any shape, if desired. For example, box 244 may be a sphere.

Moreover, additional equipment may be attached to load engaging system 200 of FIG. 3A, thereby enhancing the capabilities of load carrying assembly 190. As an example, a stretcher may be attached to attachment 235 of load engaging system 200 for rescue missions. As another example, a cargo net may be attached to attachment 235 of load engaging system 200 for carrying bulky loads.

Furthermore, hoist 170 of FIG. 1A and cargo hook arrangement 180 of FIG. 1B are shown to include a winch and the first end 176 of cargo cable 175 may be attachable to the winch. However, the winch may be part of the load carrying assembly 190 instead, and hoist 170 as well as cargo hook arrangement 180 may be adapted to receive the winch.

REFERENCE LIST 100 rotary wing aircraft
110 multi-blade main rotor
111, 112 rotor blades
113 rotor head
115 landing gear
116 motor
120 fuselage
121 fuselage underside
130 nose region
131 tail boom
140 component
150 power transmission system
160 equipment
170 hoist
175 cargo cable
176 first end of cargo cable
177 second end of cargo cable
179 power harness
180 cargo hook arrangement
190 load carrying assembly
200 load engaging system
210a, 210b first thrust producing device
215a, 215b attachment
220a, 220b second thrust producing device
230 attachment
232 swivel
235 attachment
240 connecting apparatus
242 beam
244 box
246 battery
250 sensors
252 camera
260 communication device
270 controller
300 flowchart
310, 320, 330 operation

What is claimed is:

1. A load carrying assembly for carrying a load with a rotary wing aircraft, the load carrying assembly comprising a cargo cable and a load engaging system,
the cargo cable comprising:
a first end that is attachable to at least one of a hoist or a cargo hook arrangement of the rotary wing aircraft, and
a second end; and
the load engaging system, comprising:
a first attachment that is attached to the second end of the cargo cable,
a second attachment that is adapted for receiving a load,
a connecting apparatus that connects the first attachment with the second attachment, wherein the connecting apparatus extends between the first and second attachments in a first direction and comprises a beam that connects the first attachment with the second attachment, wherein the beam is adapted to transfer the weight of the load from the second attachment to the first attachment and wherein the beam defines the first direction,
at least two first thrust producing devices that are attached to the connecting apparatus and produce thrust in a second direction that is orthogonal to the first direction, and
at least two second thrust producing devices that are attached to the connecting apparatus and produce thrust in a third direction that is orthogonal to the first and the second directions.

2. The load carrying assembly of claim 1, wherein the cargo cable is provided to move the load engaging system in the first direction.

3. The load carrying assembly of claim 1, wherein the at least two first thrust producing devices are adapted to move the load engaging system in the second direction and to enable rotational movement around an axis defined by the first direction.

4. The load carrying assembly of claim 1, wherein the at least two second thrust producing devices are adapted to move the load engaging system in the third direction.

5. The load carrying assembly of claim 1, wherein the at least two first thrust producing devices comprise rotating blades.

6. The load carrying assembly of claim 1, wherein the at least two second thrust producing devices comprise rotating blades.

7. The load carrying assembly of claim 1, wherein the connecting apparatus comprises:
a box that is attached to the beam.

8. The load carrying assembly of claim 7, wherein the at least two first thrust producing devices are attached to the connecting apparatus in the third direction on opposite sides of the box, and wherein the at least two second thrust producing devices are attached to the connecting apparatus on the same side of the box at which the second attachment is arranged.

9. The load carrying assembly of claim 7, wherein the first attachment further comprises:
a swivel that is provided to enable rotational movement of the box around the axis defined by the first direction relative to the cargo cable.

10. The load carrying assembly of claim 1, further comprising:
a plurality of sensors that is attached to the connecting apparatus and generates sensor data about the status of the load engaging system, wherein the sensor data is associated with at least one of a motion variation of the load engaging system, a rotation around the axis defined by the first direction, a rotation around a first additional axis defined by the second direction, or a rotation around a second additional axis defined by the third direction.

11. The load carrying assembly of claim 10, wherein the plurality of sensors further comprises:
a camera that is attached to the connecting apparatus and generates sensor data in form of a video feed.

12. The load carrying assembly of claim 10, further comprising:
a communication device that is attached to the connecting apparatus, coupled to at least some of the plurality of sensors, and adapted to send at least a portion of the sensor data from the at least some of the plurality of sensors to an operator and to receive command signals from the operator.

13. The load carrying assembly of claim 12, further comprising:
a controller that is attached to the connecting apparatus and controls the at least two first and second thrust producing devices based at least on some of the sensor data or the command signals from the operator.

14. The load carrying assembly of claim 1, further comprising:
at least one of a battery that is attached to the connecting apparatus or a power harness that is coupled to the cargo cable, wherein the at least one of a battery or a power harness supplies electricity to the at least two first thrust producing devices.

15. A method for operating a load carrying assembly of claim 1, comprising:
using a plurality of sensors to generate sensor data about the status of a load engaging system that is attached via a cargo cable and at least one of a hoist or a cargo hook arrangement to the rotary wing aircraft, wherein the sensor data is associated with at least one of a motion variation of the load engaging system, a rotation around a first axis defined by a first direction, a rotation around a second axis defined by a second direction, or a rotation around a third axis defined by a third direction, wherein the first, second, and third directions are orthogonal to each other;
with a communication device, receiving command signals from an operator; and
using a controller to control at least some of at least two first and second thrust producing devices based at least on some of the sensor data or the command signals from the operator.

16. The load carrying assembly of claim 7, wherein the at least two first thrust producing devices are attached to the connecting apparatus in the third direction laterally spaced from and on opposite sides of the box, and wherein the at least two second thrust producing devices are attached to the connecting apparatus below the box and on the same side of the box at which the second attachment is arranged.

17. The load carrying assembly of claim 16, wherein the box has a first side, a second side opposite the first side, a top side above the first and second sides, and a bottom side below the first and second sides, wherein a first one of the at least two first thrust producing devices is attached on the first side of the box and laterally spaced from the box, and a second one of the at least two first thrust producing devices is attached on the second side of the box and laterally spaced from the box.

18. The load carrying assembly of claim 17, wherein the at least two second thrust producing devices are attached to the bottom side of the box such that they are directly below the bottom side.

19. A load carrying assembly for carrying a load with a rotary wing aircraft, the load carrying assembly comprising a cargo cable and a load engaging system,
the cargo cable comprising:
a first end attachable to the rotary wing aircraft, and
a second end; and
the load engaging system, comprising:
a first attachment attached to the second end of the cargo cable,
a second attachment adapted for receiving a load,
a connecting apparatus that connects the first attachment with the second attachment, the connecting apparatus extending between the first and second attachments in a first direction and comprising a beam that connects the first attachment with the second attachment, wherein the beam is adapted to transfer the weight of load from the second attachment to the first attachment and wherein the beam defines the first direction,
at least two first thrust producing devices attached to the connecting apparatus adapted to produce thrust in a second direction orthogonal to the first direction, and
at least two second thrust producing devices attached to the connecting apparatus adapted to produce thrust in a third direction orthogonal to the first and the second directions.

20. A load engaging system for a load carrying assembly, the load carrying assembly for carrying a load with a rotary wing aircraft, the load carrying assembly comprising a cargo cable and the load engaging system, the cargo cable comprising a first end attachable to the rotary wing aircraft, and a second end, the load engaging system, comprising:
a first attachment attachable to the second end of the cargo cable,
a second attachment adapted for receiving a load,
a connecting apparatus that connects the first attachment with the second attachment, the connecting apparatus extending between the first and second attachments in a first direction and comprising a beam that connects the first attachment with the second attachment, wherein the beam is adapted to transfer the weight of the load from the second attachment to the first attachment and wherein the beam defines the first direction,
at least two first thrust producing devices attached to the connecting apparatus adapted to produce thrust in a second direction orthogonal to the first direction, and
at least two second thrust producing devices attached to the connecting apparatus adapted to produce thrust in a third direction orthogonal to the first and the second directions.

* * * * *